(12) United States Patent
Peng et al.

(10) Patent No.: US 12,302,928 B2
(45) Date of Patent: May 20, 2025

(54) APPLICATION OF ACYLATED DERIVATIVE OF AMINO ACID IN PREPARATION OF ANIMAL FEED ADDITIVE

(71) Applicant: ANIPHA TECHNOLOGIES PTY LTD, Toorak Gardens (AU)

(72) Inventors: Xianfeng Peng, Guangzhou (CN); Huacheng Huang, Guangzhou (CN)

(73) Assignee: ANIPHA TECHNOLOGIES PTY LTD, Toorak Gardens (AU)

(*) Notice: Subject to any disclaimer, the term of this patent is extended or adjusted under 35 U.S.C. 154(b) by 610 days.

(21) Appl. No.: 17/292,712

(22) PCT Filed: Nov. 13, 2018

(86) PCT No.: PCT/CN2018/115126
§ 371 (c)(1),
(2) Date: May 10, 2021

(87) PCT Pub. No.: WO2020/097779
PCT Pub. Date: May 22, 2020

(65) Prior Publication Data
US 2022/0007684 A1    Jan. 13, 2022

(51) Int. Cl.
*A23K 20/142*    (2016.01)
(52) U.S. Cl.
CPC .................. *A23K 20/142* (2016.05)
(58) Field of Classification Search
CPC ........ A23K 20/30; A23K 50/20; A23K 20/24; A23K 20/142; A23K 50/40; A23K 50/75
USPC ....................................................... 426/656
See application file for complete search history.

(56) References Cited

U.S. PATENT DOCUMENTS

| 4,757,066 A | 7/1988 | Shiokari et al. |
| 8,173,705 B2 | 5/2012 | Tsunenaga et al. |
| 2003/0073744 A1 | 4/2003 | Nakamura et al. |
| 2015/0126603 A1 | 5/2015 | Lauwaerts et al. |

FOREIGN PATENT DOCUMENTS

| CN | 1277019 A | 12/2000 |
| CN | 108029863 A | 5/2018 |
| CN | 108218739 A | 6/2018 |
| EP | 2123253 A1 | 11/2009 |
| EP | 2666365 A1 | 11/2013 |
| KR | 20160040568 A | 4/2016 |
| WO | 2014018913 A2 | 1/2014 |

OTHER PUBLICATIONS

International Search Report of PCT/CN2018/115126, dated Aug. 12, 2019.
English Translation of International Search Report of PCT/CN2018/115126.
Samantha M. Gromek, "Synthesis and biological evaluation of santacruzamate A analogues for anti-proliferative and immunomodulatory activity," Bioorganic & Medicinal Chemistry 24 (2016) 5183-5196.
Hyesik Kong, "Structural effects of N-aromatic acyl-amino acid conjugates on their deconjugation in the cecal contents of rats: implication in design of a colon-specific prodrug with controlled conversion rate at the target site," Biopharm. Drug Dispos. 32: 343-354 (2011).
Yasukuni Hirouchi, "Protective Effect of N-Acyl Amino Acids (NAAs) on Cephaloridine (CER) Nephrotoxicity in Rabbits," Japan. J. Phaemacol. 63, 487-493 (1993).
Communication of European Search Report (Oct. 22, 2021).
Chinese Examination Report No. 1 (Dec. 5, 2022).
English translation of CN1277019A.
English translation of CN108029863A.
English translation of CN108218739A.
English translation of KR20160040568A.

*Primary Examiner* — Subbalakshmi Prakash
(74) *Attorney, Agent, or Firm* — Kam Wah Law

(57) ABSTRACT

The present invention provides an acylated derivative of an amino acid for use in preparing an animal feed additive. The acylated derivative of the amino acid or a racemate, stereoisomer, a geometric isomer, a tautomer, a solvate, and a feed-acceptable salt thereof of the present invention has a structure represented by formula (I).

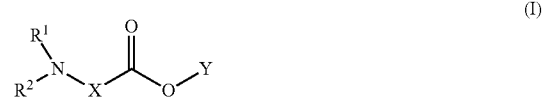

(I)

The acylated derivative of the amino acid or the racemate, the stereoisomer, the geometric isomer, the tautomer, the solvate, and the feed-acceptable salt thereof provided in the present invention may be used as an animal feed additive, and has a good effect of improving production performance of animals.

9 Claims, No Drawings

APPLICATION OF ACYLATED DERIVATIVE OF AMINO ACID IN PREPARATION OF ANIMAL FEED ADDITIVE

CROSS REFERENCE TO RELATED APPLICATION

This is a U.S. national stage application of the International Patent Application No. PCT/CN2018/115126, filed Nov. 13, 2018, which is incorporated herein by reference in its entirety.

TECHNICAL FIELD

The present invention relates to the field of animal feed additives, and particularly relates to a use of an acylated derivative of an amino acid or a solvate, and a feed-acceptable salt thereof in preparing an animal feed additive, as well as a feed composition containing the acylated derivative of an amino acid or the solvate, and the feed-acceptable salt thereof, and a use of the feed composition in preparing an animal feed additive or an animal feed.

BACKGROUND

N-acylated-γ-aminobutyric acid is a lubricating oil that may be used in daily life. N-acylated amino acid may form a salt with N-acyl aspartic acid as a preservative. N-acylated amino acid has enhanced flavor, taste and overall aroma performance, as well as juiciness and salivation, and may be used in preparing low-salt, low-umami and low-fat beverages and dairy products.

N-acylated-γ-aminobutyric acid compound further has medicinal effect. For example, studies have reported that N-benzoyl-γ-aminobutyric acid reaches a maximum blood concentration within 5 minutes after subcutaneous injection, which can antagonize the convulsion caused by bicuculline or corazol, and can inhibit a glutamate decarboxylase. N-benzoyl-γ-aminobutyric acid can further inhibit the nephrotoxicity caused by cephalosporin in a rabbit. When a dosage of administration reaches 150 mg/kg, N-benzoyl-γ-aminobutyric acid can significantly protect the kidney from cephalosporin (at a dose of 150 mg/kg).

The feed additive refers to small or trace amounts of substances added in the process of feed processing, feed production, and feed use, including a nutritional feed additive and a general feed additive. The general feed additive refers to small or trace amounts of substances mixed into the feed to ensure or improve feed quality and increase feed utilization. At present, a commonly used general feed additive that can efficiently and stably increase feed utilization and improve production performance of animals mainly includes: a high-level copper agent, a high-level zinc agent, a feed antibiotic, a chemically synthesized antibacterial agent, etc. However, the long-term use of these substances in the breeding industry will produce greater side effects, such as animal liver and kidney toxicity, growth inhibition, kidney damage, urinary tract disorders, teratogenicity, mutagenicity, drug resistance, drug residues and pollution environment. In order to protect the health of animals and improve the production efficiency of the breeding industry, it is an urgent problem to be solved in this field to seek an effective, stable and safe new-type feed additive.

In view of this, the present invention is proposed.

SUMMARY

The present invention provides a use of an acylated derivative of an amino acid or a racemate, a stereoisomer, a geometric isomer, a tautomer, solvate, a feed-acceptable salt thereof in preparing an animal feed additive, as well as a feed composition containing the acylated derivative of an amino acid or the solvate, and the feed-acceptable salt thereof, and a use of the feed composition in preparing an animal feed additive or an animal feed.

In one aspect, the present invention provides an acylated derivative of an amino acid or a racemate, a stereoisomer, a geometric isomer, a tautomer, a solvate, and a feed-acceptable salt thereof having a structure represented by formula (I).

In some technical solutions, X is $C_1$-$C_{10}$ alkylene; Y is $C_1$-$C_{20}$ alkyl, H or a metal ion; $R^1$ is $R^{1a}C(\!=\!O)$, $R^{1b}C(\!=\!O)$, $R^{1a}S(\!=\!O)_2$, $R^{1b}S(\!=\!O)_2$ or H; $R^2$ is $R^{2a}C(\!=\!O)$, $R^{2b}C(\!=\!O)$, $R^{2a}S(\!=\!O)_2$ or $R^{2b}S(\!=\!O)_2$; each of $R^{1b}$ and $R^{2b}$ is independently $C_1$-$C_{20}$ alkyl, or $C_3$-$C_7$ cycloalkyl, wherein each of $C_1$-$C_{20}$ alkyl and $C_3$-$C_7$ cycloalkyl is optionally substituted with 1, 2, 3, 4 or 5 $R^3$; and $R^3$ is —OH, —$NH_2$, —CN, —SH or —$X_1$, wherein $X_1$ is selected from F, Cl, Br or I; each of $R^{1a}$ and $R^{2a}$ is independently $C_5$-$C_{12}$ aryl, $C_5$-$C_{12}$ heteroaryl, —($C_1$-$C_4$ alkylene)-$C_5$-$C_{12}$ aryl, or —($C_1$-$C_4$ alkylene)-$C_5$-$C_{12}$ heteroaryl, wherein each of $C_5$-$C_{12}$ aryl, $C_5$-$C_{12}$ heteroaryl, —($C_1$-$C_4$ alkylene)-$C_5$-$C_{12}$ aryl, and —($C_1$-$C_4$ alkylene)-$C_5$-$C_{12}$ heteroaryl is optionally substituted with 1, 2, 3, 4 or 5 $R^4$; and $R^4$ is —OH, —$NH_2$, —$NO_2$, —CN, —SH, —$X_2$, —$C_1$-$C_5$ alkoxy, —$C_1$-$C_5$ alkyl, or is —$C_1$-$C_5$ alkyl substituted with $X_2$, wherein $X_2$ is selected from F, Cl, Br or I.

In some technical solutions, X is $C_1$-$C_5$ alkylene.

In some technical solutions, $R^1$ is $R^{1b}C(\!=\!O)$ or H; and $R^2$ is $R^{2b}C(\!=\!O)$.

In some technical solutions, each of $R^{1b}$ and $R^{2b}$ is independent $C_1$-$C_{20}$ alkyl, wherein $C_1$-$C_{20}$ alkyl is optionally substituted with 1, 2, 3, 4 or 5 $R^3$; and $R^3$ is —OH, —$NH_2$, —CN, —SH or —$X_1$, wherein $X_1$ is selected from F, Cl, Br or I.

In some technical solutions, each of $R^{1b}$ and $R^{2b}$ is independent $C_1$-$C_{10}$ alkyl group independently, wherein $C_1$-$C_{10}$ alkyl is optionally substituted with 1, 2, 3, 4 or 5 $R^3$; and $R^3$ is —OH, —$NH_2$, —CN, —SH or —$X_1$, wherein $X_1$ is selected from F, Cl, Br or I.

In some technical solutions, each of $R^{1b}$ and $R^{2b}$ is independently straight chain $C_1$-$C_{10}$ alkyl.

In some technical solutions, $R^1$ is $R^{1a}C(\!=\!O)$ or H; and $R^2$ is $R^{2a}C(\!=\!O)$.

In some technical solutions, each of $R^{1a}$ and $R^{2a}$ is independently $C_5$-$C_{12}$ aryl, —($C_1$-$C_4$ alkylene)-$C_5$-$C_{12}$ aryl, wherein each of $C_5$-$C_{12}$ aryl and —($C_1$-$C_4$ alkylene)-$C_5$-$C_{12}$ aryl is optionally substituted with 1, 2, 3, 4, or 5 $R^4$; and $R^4$ is —OH, —$NH_2$, —$NO_2$, —CN, —SH, —$X_2$, —$C_1$-$C_5$ alkoxy, —$C_1$-$C_5$ alkyl, or is —$C_1$-$C_5$ alkyl substituted with $X_2$, wherein $X_2$ is selected from F, Cl, Br or I.

In some technical solutions, each of $R^{1a}$ and $R^{2a}$ is independently $C_6$ aryl, —($C_1$-$C_4$ alkylene)-$C_6$ aryl, wherein each of $C_6$ aryl and —($C_1$-$C_4$ alkylene)-$C_6$ aryl is optionally substituted with 1, 2, 3, 4 or 5 $R^4$; and $R^4$ is —OH, —$NH_2$, —$NO_2$, —CN, —SH, —$X_2$, —$C_1$-$C_5$ alkoxy, —$C_1$-$C_5$ alkyl, or —$C_1$-$C_5$ alkyl substituted with $X_2$, wherein $X_2$ is selected from F, Cl, Br or I.

In another aspect, the present invention provides a use of the acylated derivative of an amino acid or the racemate, the stereoisomer, the geometric isomer, the tautomer, the solvate, and the feed-acceptable salt thereof in preparing an animal feed additive.

In another aspect, the present invention provides a feed composition comprising at least one of the acylated derivative of an amino acid or the racemate, the stereoisomer, geometric isomer, the tautomer, the solvate, and the feed-acceptable salt thereof provided in the present invention, and an auxiliary material usable for feed; wherein the auxiliary material usable for feed is selected from a carrier, a diluent, an excipient, a solvent, or a combination thereof that is usable for feed.

In some technical solutions, the feed composition further comprises animal feed raw materials.

In some technical solutions, the feed composition further comprises an additional animal feed additive.

In some technical solutions, the feed composition further comprises animal feed raw materials and an additional animal feed additive.

In some technical solutions, the additional animal feed additive may be selected from a nutritional feed additive and/or a general feed additive and/or a medicinal feed additive.

In another aspect, the present invention provides a use of the feed composition in preparing an animal feed additive.

In another aspect, the present invention provides a use of the feed composition in preparing an animal feed.

In another aspect, the present invention further provides a method for improving production performance of a farmed animal.

The present invention has the following beneficial effects.

The results of animal breeding experiments show that the acylated derivative of an amino acid or the racemate, the stereoisomer, the geometric isomer, the tautomer, the solvate, and feed-acceptable salt thereof provided in the present invention may be used as an animal feed additive, and has a good effect of improving production performance of animals such as growth and feed remuneration.

Any embodiment of any aspect of the present invention can be combined with other embodiments as long as there is no contradiction between them. In addition, any technical feature in any embodiment of any aspect of the present invention can apply to said technical feature in other embodiments, as long as there is no contradiction between them.

The above descriptions are merely an overview of some aspects of the present invention, but the present invention is not limited to these aspects. Contents involved in the above descriptions and contents of other aspects will be described in more detail and more thoroughly below.

DETAILED DESCRIPTION OF THE INVENTION

A further detailed description of the present invention is given below.

Now some embodiments of the present invention will be described in detail, examples of which will be illustrated by the accompanying structural formulas and chemical formulas. The present invention is intended to cover all alternatives, modifications and equivalent technical solutions, which are all included in the scope of the present invention as defined by the claims. In addition, for purpose of clarity, some technical features of the present invention are described separately in multiple independent embodiments, but they can also be provided in combination or provided in any suitable sub-combination in a single embodiment.

The above descriptions are merely an overview of some aspects of the present invention, but the present invention is not limited to these aspects. Contents involved in the above descriptions and contents of other aspects will be described in more detail and more thoroughly below.

Compounds

The compound involved in the present invention is an acylated derivative of an amino acid or a racemate, a stereoisomer, a geometric isomer, a tautomer, a solvate, and a feed-acceptable salt thereof that has a structure represented by formula (I).

formula (I)

wherein Y is the substituent group on the oxygen atom (abbreviated as O) where the active hydrogen on the carboxyl group of the amino acid is substituted, X is the methylene carbon chain contained in the amino acid, and each of $R^1$ and $R^2$ is the substituent groups on the nitrogen atom (abbreviated as N).

Further, X is $C_1$-$C_{10}$ alkylene; Y is $C_1$-$C_{20}$ alkyl, H or metal ion; $R^1$ is $R^{1a}C(=O)$, $R^{1b}C(=O)$, $R^{1a}S(=O)_2$, $R^{1b}S(=O)_2$ or H; and $R^2$ is $R^{2a}C(=O)$, $R^{2b}C(=O)$, $R^{2a}S(=O)_2$ or $R^{2b}S(=O)_2$.

Wherein, each of $R^{1b}$ and $R^{2b}$ is independently substituted or unsubstituted $C_1$-$C_{20}$ alkyl or $C_3$-$C_7$ cycloalkyl; when $R^{1b}$ and/or $R^{2b}$ is a substituted $C_1$-$C_{20}$ alkyl or a substituted $C_3$-$C_7$ cycloalkyl, wherein each of the substituted $C_1$-$C_{20}$ alkyl and $C_3$-$C_7$ cycloalkyl is $C_1$-$C_{20}$ alkyl or $C_3$-$C_7$ cycloalkyl optionally substituted with 1, 2, 3, 4 or 5 $R^3$; and $R^3$ is —OH, —$NH_2$, —CN, —SH or —$X_1$, wherein $X_1$ is selected from F, Cl, Br or I;

Each of $R^{1a}$ and $R^{2a}$ is independently substituted or unsubstituted $C_5$-$C_{12}$ aryl, $C_5$-$C_{12}$ heteroaryl, —($C_1$-$C_4$ alkylene)-$C_5$-$C_{12}$ aryl, or —($C_1$-$C_4$ alkylene)-$C_5$-$C_{12}$ heteroaryl; wherein $R^{1a}$ and/or $R^{2a}$ is substituted $C_5$-$C_{12}$ aryl, substituted $C_5$-$C_{12}$ heteroaryl, substituted —($C_1$-$C_4$ alkylene)-$C_5$-$C_{12}$ aryl, or substituted —($C_1$-$C_4$ alkylene)-$C_5$-$C_{12}$ heteroaryl, each of the substituted $C_5$-$C_{12}$ aryl, the substituted $C_5$-$C_{12}$ heteroaryl, the substituted —($C_1$-$C_4$ alkylene)-$C_5$-$C_{12}$ aryl, and the substituted —($C_1$-$C_4$ alkylene)-$C_5$-$C_{12}$ heteroaryl is respectively $C_5$-$C_{12}$ aryl, $C_5$-$C_{12}$ heteroaryl, —($C_1$-$C_4$ alkylene)-$C_5$-$C_{12}$ aryl, or —($C_1$-$C_4$ alkylene)-$C_5$-$C_{12}$ heteroaryl optionally substituted with 1, 2, 3, 4 or 5 $R^4$; $R^4$ is —OH, —$NH_2$, —$NO_2$, —CN, —SH, —$X_2$, —$C_1$-$C_5$ alkoxy, —$C_1$-$C_5$ alkyl, or —$C_1$-$C_5$ alkyl substituted with $X_2$, wherein $X_2$ is selected from F, Cl, Br or I.

Generally, "substituted" means that one or more hydrogen atoms that can be substituted in a given structure are substituted by specific substituents. A substituted group may have a substituent group to substitute at each position that can be substituted in the group. When more than one position in the given structural formula can be substituted by one or more substituents of a specific group, the each positions may be substituted by the substituent groups identically or differently.

In the present invention, "$C_a$-$C_b$ alkyl" represents a straight or branched chain saturated alkyl group containing a to b carbon atoms, such as methyl, ethyl, propyl, isopropyl, . . . , for example, "$C_1$-$C_5$ alkyl" represents a straight or branched chain saturated alkyl group containing 1 to 5 carbon atoms; "$C_3$-$C_7$ cycloalkyl" represents a cyclic alkyl group with only carbon and hydrogen elements containing 3-7 carbon atoms, such as cyclopropyl, 2-methylcyclopropyl, cyclopentyl; "$C_1$-$C_5$ alkoxy" represents a group containing 1 to 5 carbon atoms and one oxygen atom, such as methoxy, ethoxy, propoxy, isopropoxy; "$C_5$-$C_{12}$ aryl" represents a cyclic group with aromaticity containing 5 to 12 carbon atoms, such as benzene ring; "$C_5$-$C_{12}$ heteroaryl" represents a cyclic group with aromaticity containing 5 to 12 carbon atoms and more than one heteroatom (including but not limited to oxygen atom (O), sulfur atom (S), nitrogen atom (N)), such as pyrrolidinyl, pyridinyl; and "$C_n$-$C_m$ alkylene" represents an alkyl group containing n or m methylene, such as $CH_2$, $(CH_2)_2$.

In some embodiments, in the acylated derivative of the amino acid, X is preferably $C_1$-$C_5$ alkylene, Y is $C_1$-$C_{20}$ alkyl, H or metal ion; $R^1$ is $R^{1a}C(=O)$, $R^{1b}C(=O)$, $R^{1a}S(=O)_2$, $R^{1b}S(=O)_2$ or H; and $R^2$ is $R^{2a}C(=O)$, $R^{2b}C(=O)$, $R^{2a}S(=O)_2$ or $R^{2b}S(=O)_2$.

In some embodiments, the X is $CH_2$, and the acylated derivative of the amino acid has a structure represented by formula (II).

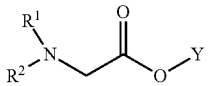
(II)

In an embodiment, the X is $(CH_2)_3$, and the acylated derivative of the amino acid has a structure represented by formula (III).

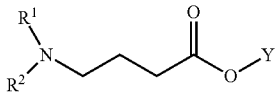
(III)

In some implementations, in the acylated derivative of the amino acid represented by formula (I), formula (II) or formula (III), the $R^1$ is $R^{1a}S(=O)_2$, $R^{1b}S(=O)_2$ or H, and $R^2$ is $R^{2a}S(=O)_2$ or $R^{2b}S(=O)_2$.

Further, in the acylated derivative of the amino acid, the $R^1$ is H, and the $R^2$ is $R^{2a}S(=O)_2$ or $R^{2b}S(=O)_2$.

In some embodiments, in the acylated derivative of the amino acid represented by formula (I), formula (II) or formula (III), the $R^1$ is $R^{1a}C(=O)$, $R^{1b}C(=O)$ or H, and $R^2$ is $R^{2a}C(=O)$ or $R^{2b}C(=O)$.

Further, in the acylated derivative of the amino acid, the $R^1$ is H, and $R^2$ is $R^{2a}C(=O)$ or $R^{2b}C(=O)$.

In some embodiments, in the acylated derivative of the amino acid represented by formula (I), formula (II) or formula (III), each of $R^{1a}$ and $R^{2a}$ is independently substituted or unsubstituted $C_5$-$C_{12}$ aryl; wherein $R^{1a}$ and/or $R^{2a}$ is substituted $C_5$-$C_{12}$ aryl, the substituted $C_5$-$C_{12}$ aryl is $C_5$-$C_{12}$ aryl optionally substituted with 1, 2, 3, 4 or 5 $R^4$; and $R^4$ is —OH, —$NH_2$, —$NO_2$, —CN, —SH, —$X_2$, —$C_1$-$C_5$ alkoxy, —$C_1$-$C_5$ alkyl, or —$C_1$-$C_5$ alkyl substituted with $X_2$, wherein $X_2$ is selected from F, Cl, Br or I.

Optionally, each of $R^{1a}$ and $R^{2a}$ is independently substituted or unsubstituted $C_6$ aryl; wherein $R^{1a}$ and/or $R^{2a}$ is substituted $C_6$ aryl, the substituted $C_6$ aryl is $C_6$ aryl optionally substituted with 1, 2, 3, 4 or 5 $R^4$; $R^4$ is —OH, —$NH_2$, —$NO_2$, —CN, —SH, —$X_2$, —$C_1$-$C_5$ alkoxy, —$C_1$-$C_5$ alkyl, or —$C_1$-$C_5$ alkyl substituted with $X_2$, wherein $X_2$ is selected from F, Cl, Br or I.

Specifically, the $C_6$ aryl is phenyl.

In some embodiments, each of $R^{1a}$ and $R^{2a}$ in the acylated derivative of an amino acid represented by formula (I), formula (II) or formula (III) is substituted or unsubstituted —($C_1$-$C_4$ alkylene)-$C_5$-$C_{12}$ aryl or —($C_1$-$C_4$ alkylene)-$C_5$-$C_{12}$ aryl independently; wherein $R^{1a}$ and/or $R^{2a}$ is substituted —($C_1$-$C_4$ alkylene)-$C_5$-$C_{12}$ aryl or substituted —($C_1$-$C_4$ alkylene)-$C_5$-$C_{12}$ aryl, each of the substituted —(C1-C4 alkylene)-C5-C12 aryl and —(C1-C4 alkylene)-C5-C12 aryl is respectively —($C_1$-$C_4$ alkylene)-$C_5$-$C_{12}$ aryl or —($C_1$-$C_4$ alkylene)-$C_5$-$C_{12}$ aryl optionally substituted with 1, 2, 3, 4 or 5 $R^4$; $R^4$ is —OH, —$NH_2$, —$NO_2$, —CN, —SH, —$X_2$, —$C_1$-$C_5$ alkoxy, —$C_1$-$C_5$ alkyl, or —$C_1$-$C_5$ alkyl substituted with $X_2$, wherein $X_2$ is selected from F, Cl, Br or I.

Optionally, each of $R^{1a}$ and $R^{2a}$ is substituted or unsubstituted —($C_1$-$C_4$ alkylene)-$C_6$ aryl independently; wherein $R^{1a}$ and/or $R^{2a}$ is substituted —($C_1$-$C_4$ alkylene)-$C_6$ aryl, the substituted —($C_1$-$C_4$ alkylene)-$C_6$ aryl is —($C_1$-$C_4$ alkylene)-$C_6$ aryl optionally substituted with 1, 2, 3, 4 or 5 $R^4$; $R^4$ is —OH, —$NH_2$, —$NO_2$, —CN, —SH, —$X_2$, —$C_1$-$C_5$ alkoxy, —$C_1$-$C_5$ alkyl, or —$C_1$-$C_5$ alkyl substituted with $X_2$, wherein $X_2$ is selected from F, Cl, Br or I.

Specifically, the —($C_1$-$C_4$ alkylene)-$C_6$ aryl is —($C_1$-$C_4$ alkylene)-phenyl.

In some embodiments, the —($C_1$-$C_4$ alkylene)-$C_6$ aryl is benzyl.

In some embodiments, each of $R^{1a}$ and $R^{2a}$ in the acylated derivative of the amino acid represented by formula (I), formula (II) or formula (III) is substituted or unsubstituted $C_5$-$C_{12}$ heteroaryl independently; wherein $R^{1a}$ and/or $R^{2a}$ is substituted $C_5$-$C_{12}$ heteroaryl, the substituted $C_5$-$C_{12}$ heteroaryl is $C_5$-$C_{12}$ heteroaryl optionally substituted with 1, 2, 3, 4 or 5 $R^4$; $R^4$ is —OH, —$NH_2$, —$NO_2$, —CN, —SH, —$X_2$, —$C_1$-$C_5$ alkoxy, —$C_1$-$C_5$ alkyl, or —$C_1$-$C_5$ alkyl substituted with $X_2$, wherein $X_2$ is selected from F, Cl, Br or I.

Optionally, each of $R^{1a}$ and $R^{2a}$ is substituted or unsubstituted $C_5$ heteroaryl independently; wherein $R^{1a}$ and/or $R^{2a}$ is substituted $C_5$ heteroaryl, the substituted $C_5$ heteroaryl is $C_5$ heteroaryl optionally substituted with 1, 2, 3, 4 or 5 $R^4$; $R^4$ is —OH, —$NH_2$, —$NO_2$, —CN, —SH, —$X_2$, —$C_1$-$C_5$ alkoxy, —$C_1$-$C_5$ alkyl, or —$C_1$-$C_5$ alkyl substituted with $X_2$, wherein $X_2$ is selected from F, Cl, Br or I.

Specifically, the $C_5$ heteroaryl is

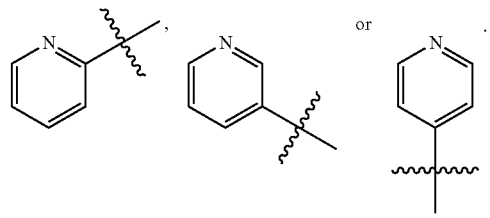 [SMILES: *c1ccccn1 ; *c1cccnc1 ; *c1ccncc1]

In some embodiments, each of $R^{1a}$ and $R^{2a}$ in the acylated derivative of an amino acid represented by formula (I), formula (II) or formula (III) is substituted or unsubstituted —($C_1$-$C_4$ alkylene)-$C_5$-$C_{12}$ heteroaryl independently; wherein $R^{1a}$ and/or $R^{2a}$ is substituted —($C_1$-$C_4$ alkylene)-$C_5$-$C_{12}$ heteroaryl, the substituted —($C_1$-$C_4$ alkylene)-$C_5$-$C_{12}$ heteroaryl is —($C_1$-$C_4$ alkylene)-$C_5$-$C_{12}$ heteroaryl optionally substituted with 1, 2, 3, 4 or 5 $R^4$; $R^4$ is —OH, —$NH_2$, —$NO_2$, —CN, —SH, —$X_2$, —$C_1$-$C_5$ alkoxy, —$C_1$-$C_5$ alkyl, or —$C_1$-$C_5$ alkyl substituted with $X_2$, wherein $X_2$ is selected from F, Cl, Br or I.

Optionally, each of $R^{1a}$ and $R^{2a}$ are substituted or unsubstituted —($C_1$-$C_4$ alkylene)-$C_5$ heteroaryl independently; wherein $R^{1a}$ and/or $R^{2a}$ is substituted —($C_1$-$C_4$ alkylene)-$C_5$ heteroaryl, the substituted —($C_1$-$C_4$ alkylene)-$C_5$ heteroaryl is-($C_1$-$C_4$ alkylene)-$C_5$ heteroaryl optionally substituted with 1, 2, 3, 4 or 5 $R^4$; $R^4$ is —OH, —$NH_2$, —$NO_2$, —CN, —SH, —$X_2$, —$C_1$-$C_5$ alkoxy, —$C_1$-$C_5$ alkyl, or —$C_1$-$C_5$ alkyl substituted with $X_2$, wherein $X_2$ is selected from F, Cl, Br or I.

Specifically, the $C_5$ heteroaryl is

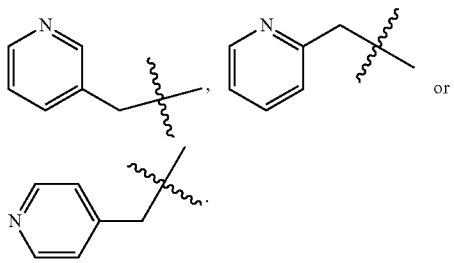

In some embodiments, each of $R^{1a}$ and $R^{2a}$ in the acylated derivative of an amino acid represented by formula (I), formula (II) or formula (III) is substituted or unsubstituted $C_1$-$C_{20}$ alkyl independently; wherein $R^{1a}$ and/or $R^{2a}$ is substituted $C_1$-$C_{20}$ alkyl, the substituted $C_1$-$C_{20}$ alkyl is $C_1$-$C_{20}$ alkyl optionally substituted with 1, 2, 3, 4 or 5 $R^3$; $R^3$ is —OH, —$NH_2$, —CN, —SH or —$X_1$, wherein $X_1$ is selected from F, Cl, Br or I;

Optionally, each of $R^{1a}$ and $R^{2a}$ is preferably straight chain $C_1$-$C_{20}$ alkyl independently.

In some embodiments, the straight chain alkyl is methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, or n-octadecyl.

Optionally, each of $R^{1a}$ and $R^{2a}$ is preferably branched chain $C_1$-$C_{20}$ alkyl independently.

In some embodiments, the branched chain alkyl is preferably isopropyl or tert-butyl.

In some technical solutions, each of $R^{1a}$ and $R^{2a}$ in the acylated derivative of the amino acid represented by formula (I), formula (II) or formula (III) is substituted or unsubstituted $C_3$-$C_7$ cycloalkyl independently; wherein $R^{1a}$ and/or $R^{2a}$ is substituted $C_3$-$C_7$ cycloalkyl, the substituted $C_3$-$C_7$ cycloalkyl is $C_3$-$C_7$ cycloalkyl optionally substituted with 1, 2, 3, 4 or 5 $R^3$; $R^3$ is —OH, —$NH_2$, —CN, —SH or —$X_1$, wherein $X_1$ is selected from F, Cl, Br or I.

Optionally, each of $R^{1b}$ and $R^{2b}$ is preferably $C_3$-$C_7$ cycloalkyl independently.

In some embodiments, the cycloalkyl is cyclopropyl, cyclopentyl or cyclohexyl.

In some technical solutions, the Y in the acylated derivative of an amino acid represented by formula (I), formula (II) or formula (III) is H.

In some technical solutions, the Y in the acylated derivative of an amino acid represented by formula (I), formula (II) or formula (III) is $C_1$-$C_{20}$ alkyl.

Optionally, the Y is straight chain $C_1$-$C_{20}$ alkyl, including but not limited to, methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, or n-octadecyl.

Further, the Y is preferably straight chain $C_1$-$C_{10}$ alkyl, in particular methyl, ethyl, n-propyl, n-butyl, n-pentyl, n-hexyl, n-heptyl, n-octyl, n-nonyl or n-decyl.

In some specific embodiments, the acylated derivative of the amino acid of the present invention includes: N-acetyl-γ-aminobutyric acid, N-butyryl-γ-aminobutyric acid, N-glycyl-γ-aminobutyric acid, N-benzoyl-γ-aminobutyric acid and N-(p-toluyl)-γ-aminobutyric acid, as well as a racemate, a stereoisomer, a geometric isomer, a tautomer, a solvate, and a feed-acceptable salt corresponding to the above compounds.

In some technical solutions, the acylated derivative of the amino acid is a feed-acceptable salt, preferably a feed-acceptable metal salt, and preferably Y is metal ion.

Further, the metal ion is a monovalent metal ion, a divalent metal ion or a trivalent metal ion.

Specifically, the monovalent metal ion includes but not limited to sodium ion, potassium ion, lithium ion, and ammonium ion; the divalent metal ion includes but not limited to calcium ion, magnesium ion, zinc ion, copper ion, ferrous ion, manganese ion; and the trivalent metal ion includes but not limited to iron ion, nickel ion, chromium ion, aluminum ion.

In some embodiments, the metal ion is zinc ion.
In some other embodiments, the metal ion is copper ion.
In some other embodiments, the metal ion is sodium ion.
In some other embodiments, the metal ion is calcium ion.
In some other embodiments, the metal ion is iron ion.

Preparation and Purification of Compounds.

A method for preparing the acylated derivative of the amino acid having the structure represented by formula (I) involved in the present invention uses an amino acid (AA for short) as a starting raw material, and chemical reactions involved mainly include the acylation of amino groups, the esterification of carboxyl groups and the hydrolysis of carboxyl esters.

In some embodiments, when Y is $C_1$-$C_{20}$ alkyl, the synthetic route of the acylated derivative of an amino acid is as shown in formula (IV):

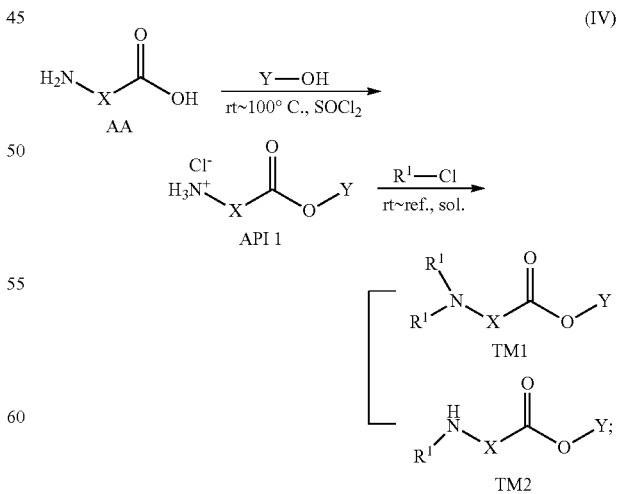

It should be clarified that Y and $R^1$ in formula (IV) only represent substituent groups. If the substance represented by the raw materials Y—OH and $R^1$—Cl is not a single substance, then Y or $R^1$ should be understood as a collection of substituent groups; Sol. represents reaction medium, $SOCl_2$ represents thionyl chloride, rt. represents room temperature, ref. represents that the reaction system solvent is boiled, cooled and refluxed.

In some embodiments, Y is —H, the synthesis method of the acylated derivative of an amino acid is as shown in formula (IV'):

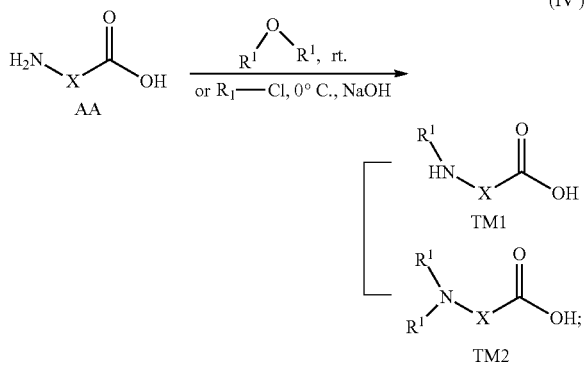

It should be clarified that $R^1$ in formula (IV') only represents a substituent group. When the substance represented by $R^1$—O—$R^1$ and $R^1$—Cl is not a single substance, then $R^1$ should be understood as a collection of substituent groups; NaOH is sodium hydroxide.

In some embodiments, the acylated derivative of the amino acid prepared by the reaction process of formula (IV) and/or formula (IV') reacts with a metal base of the first main group or the second main group, or reacts with a metal halide under basic conditions to obtain metal ion salt of the acylated derivative of an amino acid.

Optionally, the metal base is selected from sodium hydroxide, potassium hydroxide, calcium hydroxide, magnesium hydroxide, and the like.

Optionally, the metal halide is metal chloride, metal bromide or metal iodide.

Specifically, the metal chloride is zinc chloride, calcium chloride, magnesium chloride, iron chloride, copper chloride, manganese chloride, cobalt chloride or nickel chloride; the metal bromide is zinc bromide, calcium bromide, magnesium bromide, iron bromide, copper bromide, manganese bromide, cobalt bromide or nickel bromide; and the metal iodide is zinc iodide, calcium iodide, magnesium iodide, iron iodide, copper iodide, manganese iodide, cobalt iodide, or nickel iodide.

In some embodiments, the acylated derivative of an amino acid generated by the aminoacylation of an amino acid is a chiral compound, and the acylated derivative of an amino acid of the present invention is selected from levorotatory L-(−)-amino acid derivative (having a structure represented by formula (V)), dextrorotatory D-(+)-amino acid derivative (having a structure represented by formula (VI)) or racemate DL-(±) amino acid derivative.

formula (V)

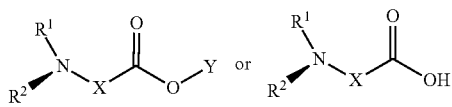

formula (VI)

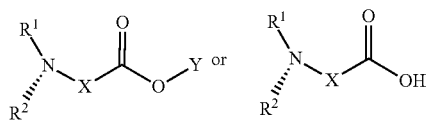

It should be clarified that $R^1$ and $R^2$ in formula (V) and formula (VI) only represents here different substituent groups.

In some embodiments, the chiral stereoisomers of the acylated derivative of the amino acid can undergo stereo configuration transformation under suitable conditions, such as the stereo conformational interconversion of the acylated derivative of the amino acid, and the interconversion process is as shown in formula (VII):

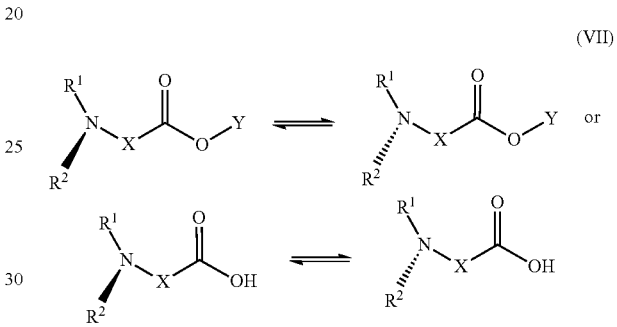

(VII)

When the involved reactant reacts with an amino acid and the like to produce a corresponding acylated derivative of aspartic acid with a rigid structure, the reaction substrate can generate different geometric isomer products during the reaction.

The aforementioned stereoisomers, geometric isomers, and tautomers are also included in the scope of the present invention.

The term "stereoisomers" refers to compounds having the same chemical structure but different arrangements of atoms or groups in space, including enantiomers, diastereomers, conformational isomers, geometric isomers, atropisomers, etc. The term "enantiomers" refers to two isomers of a compound that are mirror images of each other but are non-superposable. The term "diastereomers" refers to stereoisomers that have two or more chiral centers and whose molecules are not mirror images of each other, with different physical properties such as melting points, boiling points, spectral properties, and reactivity. Mixtures of diastereomers can be separated by high-resolution analysis operations such as electrophoresis or chromatography. The term "tautomers" refers to structural isomers with different energies that can be converted into each other through a low energy barrier.

In some embodiments, the process for preparing the acylated derivative of the amino acid provided in the present invention also involves the separation, purification or recrystallization process of the reaction product. The reaction product can be obtained as a crude product from the reaction system by the solvent removal method. In order to obtain solid substances with higher chemical purity and lower impurity content, the crude product is dissolved, crystallized or precipitated or recrystallized and separated in alcohol solvents, alcohol-water mixed solvents or other organic solvents that can be used for product recrystallization under suitable temperature, light and mechanical vibration conditions, to obtain an acylated derivative of the amino acid with a certain crystal state. The acylated derivative of the amino acid with a certain crystal state is a crystal of the acylated derivative of the amino acid or a solvate of the acylated derivative of the amino acid. The solvate of the acylated derivative of the amino acid can be selected from a hydrate of the acylated derivative of the amino acid or an ethanolate of the acylated derivative of the amino acid.

The term "solvate" refers to an co-crystallizing complex formed by bonding of the compound of the present invention to chemically equivalent or non-chemically equivalent solvent molecules through non-covalent intermolecular forces due to external conditions and internal conditions during the process of contact with solvent molecules. Solvents that form solvates include, but are not limited to, water, acetone, ethanol, methanol, dimethyl sulfoxide, ethyl acetate, acetic acid, isopropanol, etc. The term "hydrate" refers to a complex or crystal formed when the solvent molecules are water, that is, a compound obtained by bonding of chemically equivalent or non-chemically equivalent water through non-covalent intermolecular forces.

In order to obtain solid substances with higher chemical purity and lower impurity content, the preparation of the acylated derivative of the amino acid provided in the present invention can also be processed by the salting-out method. The salting-out method is a process of using the principle of acid-base neutralization method, acid-base coordination method, or acid-base chelation method to make the acylated derivative of the amino acid and the corresponding organic base, inorganic base, organic acid, or inorganic acid salt precipitate to obtain a feed-acceptable salt; the inorganic acid includes, but not limited to, hydrochloride, hydrobromide, phosphate, sulfate, nitrate, or a combination thereof; the organic base includes, but not limited to, ammonia or triethylamine; and the inorganic base includes, but not limited to, sodium hydroxide, potassium hydroxide, magnesium hydroxide, or calcium hydroxide.

The feed-acceptable salt is a salt formed by the acylated derivative of the amino acid of the present invention and an organic base, an inorganic base, an organic acid, or an inorganic acid that is non-toxic to animals. The "feed-acceptable" means that the substance or composition must be suitable in terms of chemistry or toxicology, and is related to the feed formed therefrom or the farmed animals.

In some embodiments, the acylated derivative of the amino acid of the present invention is an ester amino acid derivative, which, in the salting-out precipitation process of post-treatment, forms an acid-base coordination salt and/or acid-base chelated salt with an inorganic acid or an organic acid. The organic acid includes, but not limited to, acetate, maleate, succinate, mandelate, fumarate, malonate, malate, 2-hydroxypropionate, pyruvate, oxalate, glycolate, salicylate, glucuronate, galactitolate, citrate, tartrate, aspartate, glutamate, benzoate, p-methylbenzoate, cinnamate, p-toluenesulfonate, benzenesulfonate, methanesulfonate, ethanesulfonate, trifluoromethanesulfonate, or a combination thereof.

The present invention relates to a use of the acylated derivative of an amino acid.

The acylated derivative of an amino acid or a racemate, a stereoisomer, a geometric isomer, tautomer, a solvate and a feed-acceptable salt thereof provided in the present invention is applied in preparing an animal feed additive.

The term "animals" refers to human or farmed animals that cannot synthesize inorganic substances into organic substances, and can only use organic substances as food for life activities such as feeding, digestion, absorption, breathing, circulation, excretion, sensation, movement, and reproduction. "Farmed animals" includes poultry, livestock, aquaculture animals, and other animals that are bred in captivity or legally captured, including pets, such as cats and dogs. The term "livestock" is, for example, any of pig, cattle, horse, goat, sheep, deer, and many other useful rodents. The term "poultry" includes, for example, chicken, duck, goose, quail, pigeon and the like. The term "aquaculture animal" includes, for example, fish, shrimp, tortoise, turtle and the like.

The acylated derivative of an amino acid or a racemate, a stereoisomer, a geometric isomer, tautomer, a solvate and a feed-acceptable salt thereof provided in the present invention is applied in preparing a non-nutritional additive for improving production performance for animals at various growth stages, wherein the animals can be selected from livestock, poultry, aquaculture animals or pets at various growth stages.

Further, the livestock include, but not limited to, pigs, cattle, sheep, horses, rabbits, minks or donkeys, the poultry include, but not limited to, chickens, turkeys, ducks, geese, quails or pigeons, the aquaculture animals include, but not limited to, fish, shrimps, tortoises, crabs, turtles, bullfrogs, eel or loach, and the pets include, but not limited to, dogs or cats of various subspecies.

In an embodiment, the acylated derivative of the amino acid or the racemate, the stereoisomer, the geometric isomer, the tautomer, solvate and the feed-acceptable salt thereof provided in the present invention is applied in preparing a feed additive for improving the production performance of pigs, which can effectively improve the feed intake, the average daily gain or the feed conversion rate of pigs.

In another embodiment, the acylated derivative of the amino acid or the racemate, the stereoisomer, the geometric isomer, the tautomer, solvate and the feed-acceptable salt thereof provided in the present invention is applied in preparing a feed additive which can effectively improve production performance of broilers or laying hens.

In another embodiment, the acylated derivative of the amino acid or the racemate, the stereoisomer, the geometric isomer, the tautomer, solvate and the feed-acceptable salt thereof provided in the present invention is applied in preparing a feed additive which can improve production performance of fishes.

The feed-acceptable salt of the acylated derivative of the amino acid provided in the present invention applied in preparing an animal feed additive is a metal ion salt.

Optionally, the feed-acceptable salt of the acylated derivative of the amino acid is a metal ion salt of an acylated derivative of an amino acid that has a structure represented by formula (I).

Further, the Y in the acylated derivative of the amino acid that has a structure represented by formula (I) is H, and the metal ion salt is a salt which is obtained by exchanging H of the acylated derivative of the amino acid with the metal ion when Y is H and which meets the requirements of preparing a feed additive or a feed.

Specifically, the metal ion is selected from a monovalent metal ion, a divalent metal ion or a trivalent metal ion.

In some embodiments, the monovalent metal ion is sodium ion (Na(I)), potassium ion (K(I)) or lithium ion (Li(I)).

In some embodiments, the divalent metal ion is calcium ion Ca(II), magnesium ion Mg(II), copper ion Cu(II), zinc ion Zn(II), ferrous ion Fe(II), manganese ion Mn(II), cobalt ion Co(II) or nickel ion Ni(II).

In an embodiment, the metal ion salt of the acylated derivative of the amino acid applied in preparing an animal feed additive is a zinc ion salt, and the animal feed additive is an organic zinc agent for animals as an alternative for high level of inorganic zinc.

In an embodiment, the metal ion salt of the acylated derivative of the amino acid applied in preparing an animal feed additive is a copper ion salt, and the animal feed additive is an organic copper for animals as an alternative for high level of inorganic copper.

In an embodiment, the metal ion salt of the acylated derivative of the amino acid applied in preparing an animal feed additive is an iron ion salt, and the animal feed additive is an iron supplement for animals.

In some embodiments, the trivalent metal ion is aluminum ion Al(III), chromium ion Cr(III) or iron ion Fe(III).

Feed Composition Involved in the Present Invention.

A feed composition, comprising at least one of the acylated derivative of the amino acid or the racemate, the stereoisomer, the geometric isomer, the tautomer, solvate and the feed-acceptable salt thereof, and an auxiliary material usable for feed, wherein the auxiliary material usable for feed is a carrier, a diluent, an excipient, or a solvent suitable for use in feeding, or a combination thereof.

The feed involved in the present invention refers to a product that is industrially processed and manufactured for animal consumption.

The term "composition" refers to a compound set comprising one or more compounds as effective ingredients.

The "comprise," "include," "contain" and variants thereof in the present invention mean an open expression, which includes the contents explicitly stated in the present invention and does not exclude contents of other aspects.

The term "carrier" refers to a substance suitable for use in feeding, which can carry active ingredients to improve their dispersity and has good chemical stability and adsorption. Carriers may be organic carriers or inorganic carriers. The organic carriers are materials comprising a lot of crude fiber, including but not limited to corn flour, corn cob flour, wheat bran, rice husk flour, defatted rice bran, rice bran and hull, corn stalk flour, peanut husk flour and the like. The inorganic carriers are minerals, mainly divided into calcium salts and silicon oxides, used for the production of trace element premix, including but not limited to calcium carbonate, silicate, vermiculite, zeolite, sepiolite, etc.

The term "diluent" refers to a substance that evenly distributes the additive raw materials in the material, dilutes the high-concentration additive raw materials into a low-concentration premix or premix, and can separate trace ingredients from each other and reduce reactions between active ingredients, so as to increase the stability of the active ingredients without affecting the physical and chemical properties of related substances. Diluents include organic diluents and inorganic diluents. Organic diluents include, but not limited to, corn flour, degerminated corn flour, dextrose (glucose), sucrose, semolina with bran, stir-fried soybean powder, wheat middling, corn gluten meal, etc. Inorganic diluents include, but not limited to, limestone, calcium dihydrogen phosphate, shell powder, kaolin (white clay), table salt, and sodium sulfate.

The adjuvant is a wetting agent that induces the inherent viscosity of the substance, an adhesive that binds the substances together, a disintegrant that breaks the entire sheet of the substance into many fine particles, a retention aid that reduces the friction between particles, or an anti-sticking agent that prevents material adhesion, including but not limited to magnesium stearate, talc, vegetable oil, magnesium lauryl sulfate, starch, starch slurry, water, inorganic salt, dextrin, powdered sugar, etc.

The term "solvent" refers to the solvent required to dissolve or disperse solids, including but not limited to water, ethanol, glycerin, and the like.

In some embodiment s, the feed composition further comprises an additional animal feed additive and/or animal feed raw materials.

The animal feed additive is a nutritional feed additive, a general feed additive, or a medicinal feed additive.

The nutritional feed additive refers to a small or trace amount of substance added to compound feeds to balance feed nutrients, improve feed utilization, and directly exert nutritional effects on animals, including amino acids, amino acid salts and their analogs, vitamins and vitamin-like substances, mineral elements and their complexes (chelates), microbial enzyme preparations or non-protein nitrogen.

The general feed additive, also called a non-nutritional additive, refers to some non-nutritional substances that are added to feeds to improve feed utilization, ensure feed quality, and are beneficial to animal health or metabolism, including growth promoters, deworming agents, flavorings and attractants, feed conditioning agents, feed conditioners, feed preservatives and Chinese herbal medicine additives.

Further specifically, the non-nutritional additive is a growth promoter, including but not limited to butyric acid, calcium butyrate, sodium butyrate, tannic acid, p-thymol, p-thymol ester, p-thymol salt, 2-hydroxybenzoic acid, β-acid, β-ester, β-acid salt, hexahydro-β-acid, hexahydro-β-acid ester, hexahydro-β-acid salt, benzoic acid or calcium benzoate, zinc oxide, zinc sulfate, and zinc chloride.

In an embodiment, the non-nutritional additive is calcium butyrate.

In another embodiment, the non-nutritional additive is tannic acid.

Specifically, the medicinal feed additive includes, but not limited to, a premixed veterinary drug that has the functions of preventing animal diseases and promoting animal growth and can be added to feeds and mixed with a carriers or diluent for long-term use.

Still further specifically, the medicinal feed additive is a feed antibiotic, and the feed antibiotic includes, but not limited to, polymyxin, salinomycin, avilamycin, bacitracin, virginiamycin, nasitide, flavomycin, enramycin, kitasamycin, olaquindox, oxytetracycline, or chlortetracycline.

In some embodiments, the composition comprising the acylated derivative of the amino acid or the racemate, the stereoisomer, the geometric isomer, the tautomer, solvate and the feed-acceptable salt thereof further comprises one or more of nutritional feed additive, general feed additive, and medicinal feed additive.

In some embodiments, the animal feed raw materials are substances suitable for use in feeding, such as: grains and their processed products; oil seeds and their processed products; leguminous crops and their processed products; stem tubers, root tubers and their processed products; other seed and fruit products and their processed products; forage, roughage and their processed products; other plants, algae and their processed products; dairy products and their by-products; terrestrial animal products and their by-products; fish, other aquatic organisms and their by-products; minerals, microbial fermentation products and by-products; other feed raw materials.

Use of the Feed Composition.

The present invention relates to an application of the above feed composition comprising the acylated derivative of the amino acid or the racemate, the stereoisomer, the geometric isomer, the tautomer, solvate and the feed-acceptable salt thereof.

In some embodiments, the feed composition comprising the acylated derivative of the amino acid or the racemate, the stereoisomer, the geometric isomer, the tautomer, solvate and the feed-acceptable salt thereof is applied in preparing an animal feed additive.

The animal feed additive prepared using the feed composition comprising the acylated derivative of the amino acid or the racemate, the stereoisomer, the geometric isomer, the tautomer, solvate and the feed-acceptable salt thereof is a feed additive for livestock, a feed additive for poultry, a feed additive for aquaculture animals, or a feed additive for pets.

Specifically, the feed composition comprising the acylated derivative of the amino acid or the racemate, the stereoisomer, the geometric isomer, the tautomer, solvate and the feed-acceptable salt thereof is applied in preparing a feed additive for livestock, wherein the livestock include, but not limited to, pigs, cattle, sheep, horses, rabbits, minks, etc. at various growth stages.

Specifically, the feed composition comprising the acylated derivative of the amino acid or the racemate, the stereoisomer, the geometric isomer, the tautomer, solvate and the feed-acceptable salt thereof is applied in preparing a feed additive for poultry, wherein the poultry include, but not limited to, chickens, ducks, geese, pigeons etc. at various growth stages.

Specifically, the feed composition comprising the acylated derivative of the amino acid or the racemate, the stereoisomer, the geometric isomer, the tautomer, solvate and the feed-acceptable salt thereof is applied in preparing a feed additive for aquaculture animals, wherein the aquaculture animals include, but not limited to, fish, shrimps, crabs, turtles, eel, etc. at various growth stages.

Specifically, the feed composition comprising the acylated derivative of the amino acid or the racemate, the stereoisomer, the geometric isomer, the tautomer, solvate and the feed-acceptable salt thereof is applied in preparing a feed additive for pets, wherein the pets include, but not limited to, dogs or cats bred in captivity.

In some embodiments, the animal feed additive prepared using the feed composition comprising the acylated derivative of the amino acid or the racemate, the stereoisomer, the geometric isomer, the tautomer, solvate and the feed-acceptable salt thereof is premix, multi-premix, liquid or granule.

In some embodiments, the feed composition comprising the acylated derivative of the amino acid or the racemate, the stereoisomer, the geometric isomer, the tautomer, solvate and the feed-acceptable salt thereof is applied in preparing an animal feed.

The animal feed prepared using the feed composition comprising the acylated derivative of the amino acid or the racemate, the stereoisomer, the geometric isomer, the tautomer, solvate and the feed-acceptable salt thereof is a feed for livestock, a feed for poultry, a feed for aquaculture animals, or a feed for pets.

Specifically, the feed composition comprising the acylated derivative of the amino acid or the racemate, the stereoisomer, the geometric isomer, the tautomer, solvate and the feed-acceptable salt thereof is applied in preparing a feed for livestock, wherein the livestock include, but not limited to, pigs, cattle, sheep, horses, rabbits, minks, etc. at various growth stages.

Specifically, the feed composition comprising the acylated derivative of the amino acid or the racemate, the stereoisomer, the geometric isomer, the tautomer, solvate and the feed-acceptable salt thereof is applied in preparing a feed for poultry, wherein the poultry include, but not limited to, chickens, ducks, geese, pigeons etc. at various growth stages.

Specifically, the feed composition comprising the acylated derivative of the amino acid or the racemate, the stereoisomer, the geometric isomer, the tautomer, solvate and the feed-acceptable salt thereof is applied in preparing a feed for aquaculture animals, wherein the aquaculture animals include, but not limited to, fish, shrimps, crabs, turtles, eel, etc. at various growth stages.

Specifically, the feed composition comprising the acylated derivative of the amino acid or the racemate, the stereoisomer, the geometric isomer, the tautomer, solvate and the feed-acceptable salt thereof is applied in preparing a feed for pets, wherein the pets include, but not limited to, dogs or cats bred in captivity.

In some implementations, the feed prepared using the feed composition comprising the acylated derivative of the amino acid or the racemate, the stereoisomer, the geometric isomer, the tautomer, solvate and the feed-acceptable salt thereof is a single feed, concentrated feed, formula feed, multi-premix or concentrate supplement.

Specifically, the compound feed is a complete formula feed.

Method for Improving Production Performance of Farmed Animals.

In some feeding embodiments, farmers feed the feed additive comprising the acylated derivative of the amino acid or the racemate, the stereoisomer, the geometric isomer, the tautomer, solvate and the feed-acceptable salt thereof to animals together with a feed, which can effectively improve production performance of farmed animals.

In some embodiments, the feed additive is premix, multi-premix, granule or liquid, which is fed to animals after being mixed with an animal feed.

The animals are livestock, poultry, aquaculture animals, or pets.

Specifically, the livestock include, but not limited to, pigs, cattle, sheep, horses, rabbits, minks, etc. at various growth stages; the poultry include, but not limited to, chickens, turkeys, ducks, geese, pigeons etc. at various growth stages; the aquaculture animals include, but not limited to, fish, shrimps, crabs, turtles, eel, etc. at various growth stages; and the pets include, but not limited to, dogs or cats bred in captivity.

In an embodiment, farmers feed the feed additive comprising the acylated derivative of the amino acid or the racemate, the stereoisomer, the geometric isomer, the tautomer, solvate and the feed-acceptable salt thereof to weaned pigs together with a feed, which can significantly increase the weight gain rate of the average daily gain of weaned pigs and the feed conversion rate.

In an embodiment, farmers feed the feed additive comprising the acylated derivative of the amino acid or the racemate, the stereoisomer, the geometric isomer, the tautomer, solvate and the feed-acceptable salt thereof to broilers together with a feed, which can significantly reduce the feed conversion ratio of broilers, thereby improving the feed conversion rate.

In an embodiment, farmers feed the feed additive comprising the acylated derivative of the amino acid or the racemate, the stereoisomer, the geometric isomer, the tautomer, solvate and the feed-acceptable salt thereof to fish together with a feed.

In an embodiment, farmers feed the feed additive comprising the acylated derivative of the amino acid or the racemate, the stereoisomer, the geometric isomer, the tautomer, solvate and the feed-acceptable salt thereof to puppies together with a feed.

In some other feeding embodiments, farmers feed the feed composition comprising the acylated derivative of an amino acid or the racemate, stereoisomer, geometric isomer, tautomer, solvate or feed-acceptable salt thereof to animals, which can significantly improve production performance of animals.

Optionally, the feed composition is feed additive premix, feed additive multi-premix, granule or liquid, which is fed to animals together with a feed.

In an embodiment, the feed composition is feed additive premix.

In an embodiment, the feed composition is feed additive multi-premix.

Optionally, the feed composition is a concentrated feed, formula feed, multi-premix or concentrate supplement, which is directly fed to animals as an animal feed.

In an embodiment, the feed composition is a complete formula feed.

Now some embodiments of the present invention will be described in detail, examples of which will be illustrated by the accompanying structural formulas and chemical formulas. The present invention is intended to cover all alternatives, modifications and equivalent technical solutions, which are all included in the scope of the present invention as defined by the claims. In addition, for purpose of clarity, some technical features of the present invention are described separately in multiple independent embodiments, but they can also be provided in combination or provided in any suitable sub-combination in a single embodiment.

DETAILED DESCRIPTION OF THE EMBODIMENTS

The embodiments of the present invention will be described in detail below in conjunction with examples, but it will be understood by those skilled in the art that the following embodiments are only used to illustrate the present invention and should not be regarded as limiting the scope of the present invention. If specific conditions are not indicated in the embodiments, the embodiments should be carried out in accordance with the conventional conditions or the conditions recommended by the manufacturer. The reagents or instruments used without the manufacturer's indication are all conventional products that can be purchased in the market.

(A) Preparation of Acylated Derivative of γ-aminobutyric Acid

The method for preparing an acylated derivative of aminobutyric acid is described in detail below taking the process for the preparation of N-acetyl-γ-aminobutyric acid, N-butyryl-γ-aminobutyric acid, N-glycyl-γ-aminobutyric acid, N-benzoyl-γ-aminobutyric acid and N-(p-toluyl)-γ-aminobutyric acid as examples.

Embodiment (A1) N-acetyl-γ-aminobutyric Acid

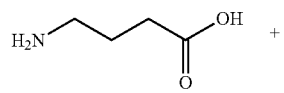

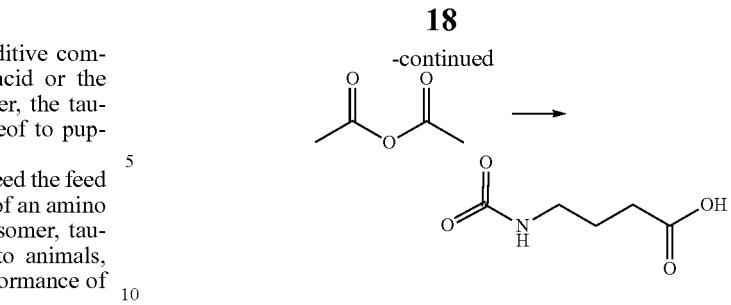

70 g of γ-aminobutyric acid was added in portions to a reaction flask containing 90 g of acetic anhydride at room temperature, and the mixture was stirred overnight at room temperature to precipitate solids which were filtered and dried to obtain 51 g of white solids with a yield of 51.7%.

$^1$HNMR (500 MHz, DMSO-$d_6$) δ: 4.85 (s, 1H), 3.19 (t, 2H), 2.31 (t, 2H), 1.91 (s, 3H), 1.74-1.80 (m, 2H).

Embodiment (A2) N-butyryl-γ-aminobutyric Acid

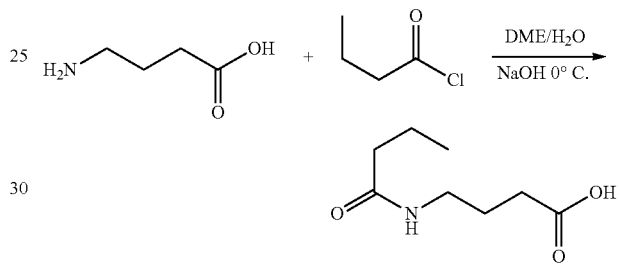

74 g of sodium hydroxide (NaOH for short) was dissolved at room temperature in 500 mL of water, 100 g of γ-aminobutyric acid was added under stirring, 500 mL of dimethyl ether (DME for short) was then added after cooling to 0° C., 131 g of butyryl chloride was slowly added dropwise; the mixture was kept at this temperature for 5.0 hours, allowed to naturally warm to room temperature, the reaction mixture was adjusted to a pH at about 3 with concentrated hydrochloric acid, and extracted with ethyl acetate (400 mL×3 times); the ethyl acetate layer was combined, dried over anhydrous sodium sulfate and concentrated; the resulting crude product was crystallized with 300 mL of n-heptane at low temperature to obtain 80 g of white solids N-butyryl-γ-aminobutyric acid with a yield of 47.6%.

$^1$HNMR (500 MHz, DMSO-$d_6$) δ: 7.56 (s, 1H), 3.39 (t, 2H), 2.30-2.34 (m, 4H), 1.89-1.92 (m, 2H), 1.29-1.31 (m, 2H), 1.18 (t, 3H).

Embodiment (A3) N-glycyl-γ-aminobutyric Acid

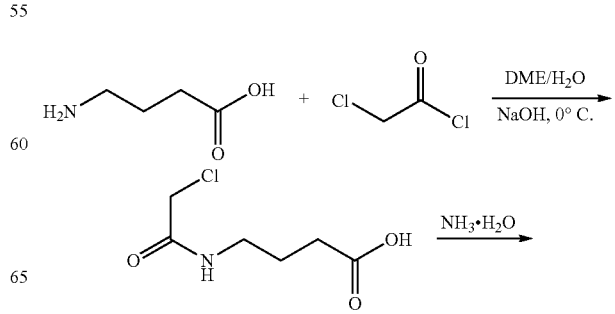

-continued

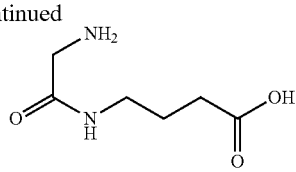

74 g of NaOH was dissolved at room temperature in 500 mL of water, 100 g of γ-aminobutyric acid was added under stirring, 500 mL of DME was then added after cooling to 0° C., and 120.6 g of chloroacetyl chloride was slowly added dropwise; the reaction mixture was kept at this temperature for 2.0 hours, then was adjusted to a pH at about 3 with concentrated hydrochloric acid, and extracted with ethyl acetate (350 mL×3 times); the ethyl acetate layer was combined, dried over anhydrous sodium sulfate and concentrated; the resulting crude product was crystallized with 100 mL of dichloromethane to obtain 81 g of white solids N-chloroacetyl-γ-aminobutyric acid with a yield of 50.9%.

$^1$HNMR (500 MHz, DMSO-$d_6$) δ: 12.02 (s, 1H), 8.19 (s, 1H), 4.02 (s, 2H), 3.09 (t, 2H), 2.21 (t, 2H), 1.63-1.67 (m, 2H).

50 g of N-chloroacetyl-γ-aminobutyric acid was added in portions to 190 mL of 25% ammonia water, and the reaction mixture was stirred overnight at room temperature, the reaction solution was concentrated to 50 mL, crystallized with 150 mL of methanol, and filtered to obtain 38.6 g of N-glycyl-γ-aminobutyric acid with a yield of 86.6%.

$^1$HNMR (500 MHz, $D_2O$) δ: 3.74 (s, 2H), 3.21 (t, 2H), 2.17 (t, 2H), 1.71-1.74 (m, 2H).

Embodiment (A4) N-benzoyl-γ-aminobutyric Acid

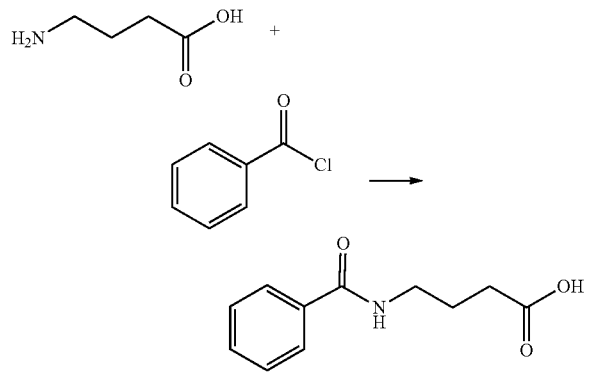

600 mL of water and 70 g of sodium hydroxide were added to a reaction flask successively, and 150 g of γ-aminobutyric acid was added under stirring, the reaction mixture was dissolved and clarified by stirring, and cooled to below 0° C.; 600 mL of tetrahydrofuran was added, and then 162 mL of benzoyl chloride was slowly added dropwise, the reaction mixture was made weakly alkaline with 3 mol/L of aqueous sodium hydroxide solution during the dropwise addition; after completion of the dropwise addition of the benzoyl chloride, the reaction mixture was kept at this temperature for 2.0 h, and then was reacted at room temperature for 3.0 h; the reaction solution was concentrated to remove tetrahydrofuran, the crude product was adjusted to pH2 with concentrated hydrochloric acid to obtain an oily substance; the oily substance was stirred for 2.0 hours and solidified, and granular solids were gradually precipitated, filtered and dried at 45° C. to obtain 280 g of white solids with a yield of 92.8%.

$^1$HNMR (500 MHz, DMSO-$d_6$) δ: 8.44 (s, 1H), 7.83 (d, 2H), 7.49 (d, 1H), 7.44 (t, 2H), 3.29 (t, 2H), 2.28 (t, 2H)), 1.73-1.79 (m, 2H).

Embodiment (A5) N-(p-toluyl)-γ-aminobutyric Acid

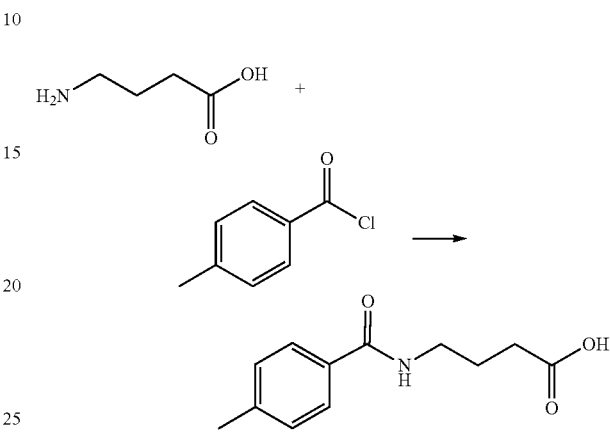

70 g of sodium hydroxide was added to a reaction flask containing 700 mL of water, and 150 g of γ-aminobutyric acid was added under stirring, the mixture was dissolved and clarified by stirring, and cooled to below 0° C.; 700 mL of tetrahydrofuran was added, and then 170 mL of p-toluyl chloride was slowly added dropwise at this temperature, the reaction mixture was made weakly alkaline with 3 mol/L of aqueous sodium hydroxide solution during the dropwise addition; after completion of the dropwise addition of the p-toluyl chloride, the reaction mixture was kept at this temperature for 2.0 h, and then allowed to naturally warm to room temperature for 3.0 h; the reaction solution was concentrated to remove tetrahydrofuran, the residue was adjusted to pH2 with concentrated hydrochloric acid to obtain an oily substance; the oily substance was stirred for 6.0 hours, filtered and dried at 55° C. to obtain 230 g of white solids with a yield of 71.4%.

$^1$HNMR (500 MHz, DMSO-$d_6$) δ: 8.34 (s, 1H), 7.73 (d, 2H), 7.49 (d, 1H), 7.34 (t, 2H), 3.19 (t, 2H), 2.31 (s, 3H), 2.28 (t, 2H), 1.69-1.71 (m, 2H).

(B) Breeding Test

Embodiment (B1) Effect of an Acylated Derivative of the Aminobutyric Acid on the Production Performance of Pigs 270 65-day-old Duroc×Landrace×Yorkshire cross-bred bacon-type pigs with similar body weight were randomly divided into 9 groups, with 3 replications per group and 10 pigs (half of male and female) per replication. The pigpens and utensils were sterilized before the test. During the test period, the test pigs were free-stall housed in the same pigpen under the same feeding and management conditions. During the test period, the test pigs were free to drink water and eat feed, and test pigs were fed twice a day. The test groups were the control group (group I) and the test groups II~IX, respectively. Wherein the basal daily ration was only given for the control group, and 400 ppm of different acylated derivative of the aminobutyric acid was added into the basal daily ration for the test groups II~IX. The groups were shown in Table 1.

No other antioxidant ingredients and growth promoters were added for the test groups during the entire feeding process. The test period was 28 days, with each repetition as a unit, the test pigs were weighed at the age of 93 days without stopping water and feed for 12 hours; the average daily feed intake (ADFI, g/d*each pig), the average daily gain (ADG, g/d*each pig) and the feed conversion ratio (FCR) were calculated for each of the test groups. The formula for calculation was as follows:

Average daily feed intake=(total amount of feed–remaining amount of feed)/(number of days of test×number of pigs per repetition);

Average daily gain=(average body weight at the end of the test–average body weight at the beginning of the test)/number of days of test;

Feed conversion ratio=average daily feed intake/average daily gain.

The results of the test were shown in Table 1.

TABLE 1

Effect of an acylated derivative of the aminobutyric acid on the production performance of pigs

| Test group | Test sample | ADFI(g/d * each pig) | ADG(g/d * each pig) | FCR |
|---|---|---|---|---|
| Group I | — | 1684 | 596 | 2.826 |
| Group II | N-acetyl-γ-aminobutyric acid | 1827 | 723 | 2.665 |
| Group III | N-glycyl-γ-aminobutyric acid | 1728 | 651 | 2.655 |
| Group IV | N-(γ-aminobutyryl)-γ-aminobutyric acid | 1831 | 693 | 2.642 |
| Group V | N-benzoyl-γ-aminobutyric acid | 1837 | 699 | 2.628 |
| Group VI | N-p-methylbenzoyl-γ-aminobutyric acid | 1769 | 672 | 2.631 |
| Group VII | N-p-chlorobenzoyl-γ-aminobutyric acid | 1675 | 642 | 2.610 |
| Group VIII | N-p-hydroxybenzoyl-γ-aminobutyric acid | 1602 | 611 | 2.620 |
| Group IX | N-p-aminobenzoyl-γ-aminobutyric acid | 1643 | 632 | 2.601 |

It can be seen from the results shown in Table 1 that, this test compares and assesses the effects of the test samples on the production performance of test pigs from three aspects: the feed intake, the gain and the feed conversion rate; Specifically: in terms of the feed intake, the effects of the acylated derivatives of the aminobutyric acid for each of the test groups are not significant; in terms of the average daily gain of the test pigs, each of the test groups has an increase compared with the control group, and the rate of increase is 2.52%-21.31%; and in terms of the feed conversion ratio, each of the test groups has a relatively obvious decrease, and the rate of decrease is about 7.96%-5.7%.

It can be seen that the acylated derivative of an amino acids provided in the present invention can effectively improve the growth performance of pigs.

Embodiment (B2) Effect of an Acylated Derivative of the Aminobutyric Acid on the Production Performance of Laying Hens The test adopted a single-factor random design. 1,080 147-day-old Jingbai laying hens with similar body weight were selected and randomly divided into 9 groups, with 6 replications per group and 20 Jingbai laying hens per replication. The poultry houses and utensils were sterilized before the test. During the test period, the Jingbai laying hens were cage cultured in the same poultry house under the same feeding and management conditions. The basal daily ration was mainly corn-soybean meal, and no other antioxidant ingredients and growth promoters were added additionally during the entire feeding process. The test groups were the control group (group I) and the test groups II~IX, respectively. The basal daily ration was only given for the control group, and 150 ppm of different acylated derivatives of the aminobutyric acid were added into the basal daily ration for the test groups II~IX. The groups were shown in Table 2. The pre-feeding period was 10 days, and the test period was 158 days. The test laying hens were free to drink water and eat feed, and were fed twice a day. The test takes each repetition as a unit, and records the total egg number, the egg production, and the feed intake every day, and calculates the egg production rate (EPR), the average daily feed intake (ADFI, g/d), the egg weight (EW, g) and the feed-to-egg ratio (FER) of the laying hens during the entire test. The formula for calculation was as follows:

Egg production rate (%)=average daily total egg number/number of laying hens×100;

Egg weight (g)=average daily total egg weight/average daily total egg number;

Feed-to-egg ratio=average daily feed intake/egg weight.

The results of the test were shown in Table 2.

TABLE 2

Study on the use of an acylated derivative of the aminobutyric acid in laying hen feed

| Test sample | | EPR (%) | ADFI (g/d) | EW (g) | EPR |
|---|---|---|---|---|---|
| Group I | — | 75.4 | 163 | 52.9 | 3.086 |
| Group II | N-acetyl-γ-aminobutyric acid | 82.2 | 160 | 55.24 | 2.904 |
| Group III | N-glycyl-γ-aminobutyric acid | 82.9 | 161 | 55.61 | 2.894 |
| Group IV | N-(γ-aminobutyryl)-γ-aminobutyric acid | 84.4 | 160 | 55.24 | 2.895 |
| Group V | N-benzoyl-γ-aminobutyric acid | 86.7 | 158 | 54.92 | 2.886 |
| Group VI | N-p-methylbenzoyl-γ-aminobutyric acid | 84.4 | 159 | 54.81 | 2.897 |
| Group VII | N-p-chlorobenzoyl-γ-aminobutyric acid | 81.4 | 160 | 55.07 | 2.901 |
| Group VIII | N-p-hydroxybenzoyl-γ-aminobutyric acid | 81.8 | 161 | 55.27 | 2.910 |
| Group IX | N-p-aminobenzoyl-γ-aminobutyric acid | 82.6 | 161 | 55.31 | 2.914 |

It can be seen from the results shown in Table 2 that, the effects of the test samples on the production performance of the test laying hens are very significant. Specifically, compared with the results of the control group, it can be seen that the egg production rate and the average egg weight for each of the test groups are significantly increased, but the test samples have no effect on the feed intake of the test laying hens. In addition, the feed-to-egg ratio of the test groups is also significantly decreased, which shows that the utilization rate of feed is also significantly improved.

Embodiment (B3) Effect of an Acylated Derivative of the Aminobutyric Acid on the Production Performance of Broilers The test adopted a single-factor random design. 1,080 1-day-old yellow-feathered broilers with similar body weight and the average weight of 50 g were selected and randomly divided into 9 groups, with 6 replications per group and 20 yellow-feathered broilers (half of male and female) per replication. The poultry houses and utensils were sterilized before the test. During the test period, the yellow-feathered broilers were housed in the same poultry house under the same feeding and management conditions. The basal daily ration was mainly corn-soybean meal, and no other antioxidant components and growth promoters were added additionally during the entire feeding process. The test groups were the control group (group I) and the test groups II~IX, respectively. The basal daily ration was only given for the control group, and 300 ppm of different acylated derivatives of the aminobutyric acid were added into the basal daily ration for the test groups II~IX. The groups were shown in Table 3.

The test period was 20 days. The test broilers were free to drink water and eat feed, and were fed twice a day. With each repetition as a unit, the test broilers were weighed at the age of 21 days (stopping feed for 12 hours, without stopping water), the feed consumption of test broilers were recorded, and the average daily feed intake (ADFI, g/d*each broiler), the average daily gain (ADG, g/d*each broiler) and feed conversion ratio (FCR) were calculated for each of the test groups. The formula for calculation was as follows:

Feed conversion ratio (FCR)=average daily feed intake/average daily gain.

The results of the test were shown in Table 3.

TABLE 3

Study on the use of an acylated derivative of the aminobutyric acid in broiler feed

| | Test sample | ADFI(g/ d * each broiler) | ADG(g/ d * each broiler) | FCR |
|---|---|---|---|---|
| Group I | — | 25.38 | 11.92 | 2.13 |
| Group II | N-acetyl-γ-aminobutyric acid | 31.06 | 15.15 | 2.05 |
| Group III | N-glycyl-γ-aminobutyric acid | 26.17 | 13.02 | 2.01 |
| Group IV | N-(γ-aminobutyryl)-γ-aminobutyric acid | 28.94 | 14.62 | 1.98 |
| Group V | N-benzoyl-γ-aminobutyric acid | 27.56 | 14.13 | 1.95 |
| Group VI | N-p-methylbenzoyl-γ-aminobutyric acid | 27.13 | 13.84 | 1.96 |
| Group VII | N-p-chlorobenzoyl-γ-aminobutyric acid | 24.88 | 12.32 | 2.02 |
| Group VIII | N-p-hydroxybenzoyl-γ-aminobutyric acid | 24.52 | 12.32 | 1.99 |
| Group IX | N-p-aminobenzoyl-γ-aminobutyric acid | 25.84 | 12.42 | 2.08 |

It can be seen from the results shown in Table 3 that, the test samples also have a significant effect on the feed intake of the test broilers, and specifically: the additives such as the N atom acetylated, glycylated, aminobutyrylated, benzoylated and p-methylbenzoylated derivatives of the aminobutyric acid has a significant improvement effect on the feed intake of the test broilers. However, when the benzene ring of the benzoyl aminobutyric acid additive is substituted by halogen or hydroxyl, the feed intake of the test broilers is decreased slightly. Nevertheless, it can be known according to the average daily gain and feed conversion ratio of each of the test groups that, compared with the control group, each of the test groups added with the additives of the present invention has a more significant improvement effect in terms of the gain and feed conversion ratio of the test broilers.

Embodiment (B4) Use of an Acylated Derivative of the Aminobutyric Acid in Fish Feed The test fishes used were grass carps, and the test was carried out in the aquaculture farm of the test field of Guangzhou Insighter. Healthy, lively, and uniform grass carp fingerlings were fed in large cages for 4 weeks before being used for formal breeding test. The experimental system was a small floating cage. Both the small cage and the temporary cage were placed in a 3500 m$^2$ pond of the test field, the depth of the pond was about 1.5 m, and the water of the pond was fully aerated in the bottom of the pond. During the test, 360 grass carps that were hungry for 1 day were randomly divided into 9 groups, with 4 replications per group and 10 grass carps per replication. All of the grass carps were weighed, and then were randomly placed in 36 cages and fed with different test feeds. The test feeds were self-prepared, and 150 ppm of different acylated derivatives of the aminobutyric acid were added into the basal feed for different test groups, respectively. The test groups were the control group (group I) and the test groups IIX, respectively. The basal daily ration was only given for the control group, and 150 ppm of different acylated derivatives of the aminobutyric acid were added into the basal daily ration for the test groups IIX. The groups were shown in Table 4.

The test adopted time-limited artificial feeding, and the feeding amount was adjusted once a week. The feeding rate of the control group and the feeding rate of the test groups (according to the initial body weight) were exactly the same, and the grass carps were fed twice a day (7:30 and 15:00). The test period was 8 weeks.

The test results of different acylated derivatives of the aminobutyric acid on promoting growth of fishes are shown in Table 4.

TABLE 4

Test groups and results of use of the acylated derivative of theaminobutyric acid in grass carp feed

| | Test sample | Average initial weight (g) | Average final weight (g) | Weight gain rate (%) | (FCR) |
|---|---|---|---|---|---|
| Group I | — | 399 | 706 | 76.94 | 1.89 |
| Group II | N-acetyl-γ-aminobutyric acid | 413 | 733 | 77.59 | 1.81 |
| Group III | N-glycyl-γ-aminobutyric acid | 424 | 755 | 78.17 | 1.75 |
| Group IV | N-(γ-aminobutyryl)-γ-aminobutyric acid | 385 | 707 | 83.69 | 1.80 |
| Group V | N-benzoyl-γ-aminobutyric acid | 397 | 721 | 81.62 | 1.79 |
| Group VI | N-p-methylbenzoyl-γ-aminobutyric acid | 406 | 739 | 82.10 | 1.74 |
| Group VII | N-p-chlorobenzoyl-γ-aminobutyric acid | 402 | 730 | 81.51 | 1.77 |
| Group VIII | N-p-hydroxybenzoyl-γ-aminobutyric acid | 391 | 710 | 81.50 | 1.82 |
| Group IX | N-p-aminobenzoyl-γ-aminobutyric acid | 398 | 713 | 79.20 | 1.84 |

It can be seen from the test results shown in above Table 4 that, the test groups added with the acylated derivative of the aminobutyric acid are better than the control group in terms of the gain and the feed conversion rate, and have a significant growth-promoting effect.

Although the present invention has been illustrated and described by means of specific embodiments, it should be appreciated that many other changes and modifications can be made without departing from the spirit and scope of the present invention. Therefore, this means that all these changes and modifications that fall within the scope of the present invention are included in the appended claims.

INDUSTRIAL APPLICABILITY

The acylated derivative of an amino acid provided in the present invention may be used to prepare an animal feed additive or an animal feed, and has the effect of improving the production performance of animal such as growth and feed remuneration, and the preparation and use of the compound are convenient and easy to implement.

What is claimed is:

1. A feed composition comprising an acylated derivative of an amino acid; and an auxiliary material usable for feed, wherein the auxiliary material usable for feed is selected from a carrier, a diluent, an excipient, a solvent, or a combination thereof that is usable for feeding an animal, and wherein the acylated derivative of an amino acid is N-benzoyl-γ-aminobutyric acid, N-p-methylbenzoyl-γ-aminobutyric acid, N-p-chlorobenzoyl-γ-aminobutyric acid, N-p-hydroxybenzoyl-γ-aminobutyric acid, N-p-aminobenzoyl-γ-aminobutyric acid, or a combination thereof.

2. The feed composition according to claim 1 further comprising an additional animal feed additive, wherein the additional animal feed additive is selected from at least one of a nutritional feed additive, a non-nutritional feed additive and a medicinal feed additive.

3. The feed composition according to claim 1 further comprising an animal feed raw material.

4. A method of improving animal production performance, wherein the method comprises administering an animal feed additive to an animal; and wherein the animal feed additive comprises the feed composition according to claim 1.

5. A method of improving animal production performance, wherein the method comprises administering an animal feed to an animal; and wherein the animal feed comprises the feed composition according to claim 1.

6. The feed composition according to claim 2 further comprising an animal feed raw material.

7. A method of improving animal production performance, wherein the method comprises administering an animal feed additive to an animal; and wherein the animal feed additive comprises the feed composition according to claim 2.

8. A method of improving animal production performance, wherein the method comprises administering an animal feed to an animal; and wherein the animal feed comprises the feed composition according to claim 2.

9. A method of improving animal production performance, wherein the method comprises administering the feed composition according to claim 1 to an animal.

* * * * *